United States Patent [19]

Kunugi et al.

[11] Patent Number: 4,942,611
[45] Date of Patent: Jul. 17, 1990

[54] METHOD OF CORRECTING MISALIGNMENT OF A WORKPIECE ON NUMERICALLY CONTROLLED MACHINE TOOL

[75] Inventors: Takashi Kunugi; Yoshinari Sasaki, both of Numazu, Japan

[73] Assignee: Toshiba Kikai Kabushiki Kaisha, Tokyo, Japan

[21] Appl. No.: 211,291

[22] Filed: Jun. 24, 1988

[30] Foreign Application Priority Data

Jun. 26, 1987 [JP] Japan .................... 62-160421

[51] Int. Cl.⁵ .................... G06F 15/46; G05B 19/18; B24B 1/00
[52] U.S. Cl. .................... 364/474.06; 51/289 R; 51/165.71; 364/474.18; 364/474.34; 364/474.35
[58] Field of Search .................... 364/474.06, 474.17, 364/474.18, 474.34, 474.36, 474.35; 51/49, 289 R, 165.71, 165.75, 165.87, 165.88; 318/571, 572, 632

[56] References Cited

U.S. PATENT DOCUMENTS

| | | | |
|---|---|---|---|
| 3,422,583 | 1/1969 | Stuckey et al. | 51/289 R |
| 3,430,400 | 3/1969 | Parrella et al. | 51/289 R |
| 3,660,944 | 5/1972 | Tittle et al. | 51/49 |
| 4,371,941 | 2/1983 | Gordiski et al. | 364/474.06 X |
| 4,441,281 | 4/1984 | Gordiski | 364/474.06 X |
| 4,516,212 | 5/1985 | Nagashima | 364/474.06 X |

Primary Examiner—Joseph Ruggiero
Attorney, Agent, or Firm—Banner, Birch, McKie & Beckett

[57] ABSTRACT

A numerically controlled machine tool machines a workpiece into a roll while rotating the workpiece at a prescribed speed, moving the tool back and forth radially thereof, and moving the tool axially thereof. The misalignment of the workpiece with the axis of the machine tool can be corrected by measuring the amount of misalignment of the axis of the workpiece and entering the measured amount as corrective data into a control system which stores numerical control data produced by successively programming amounts of radial movement of a tool dependent on axial positions of the tool; calculating corrected values of, among said numerical control data, the positional data of the tool in the axial direction and/or corrected values of the data on the amounts of movement of the tool in the radial direction, based on the corrective data; and controlling said tool based on the calculated corrected values to machine the workpiece.

5 Claims, 2 Drawing Sheets

METHOD OF CORRECTING MISALIGNMENT OF A WORKPIECE ON NUMERICALLY CONTROLLED MACHINE TOOL

BACKGROUND OF THE INVENTION

The present invention relates to a numerically controlled machine tool such as a roll grinder or the like for grinding a workpiece into a roll, and more particularly to a method of correcting the misalignment of a workpiece on a numerically controlled machine tool, which is caused when the axis of the workpiece is displaced off the axis of the machine tool, by automatically correcting numerical control data according to the misalignment.

Numerically controlled machine tools such as roll grinders or the like for grinding a workpiece into a roll are generay arranged to operate by rotating the workpiece about its own axis at a given speed, and moving a tool back and forth radially of the workpiece while moving the tool axially of the workpiece. Since the machine tools are required to move the tool in the above manner, the machine tools have memory mean for storing numerical control data based on which amounts of radial movement of the tool at respective axial positions thereof are successively programmed, and a control unit for distributing command pulses to an actuator for moving the tool based on the stored numerical control data. The machine tools are widely used to machine rolls for use in rolling mills, or he like.

A workpiece to be machined by such numerically controlled machine tool has to be accurately attached along the axis of the machine tool. However, inasmuch as a workpiece to be machined into a roll for use in a rolling mill is large in volume and weight, it is quite difficult to mount the central axis or axis of rotation of workpiece in exact alignment with the axis of the machine tool. If the workpiece as mounted on the machine tool is tilted with respect to the axis of the machine tool, the workpiece will be misaligned in a machining process.

The numerical control data stored in the memory means of the numerically controlled machine tool are established with reference to coordinates in the axial direction of the machine too. Therefore, if a misaligned workpiece is machined into a roll, the circumferential surface of the completed roll is not ground parallel to the central axis thereof, but ground to a tapered shape. In order to prevent a workpiece from being misaligned on a numerically controlled machine tool, it is necessary to install the workpiece in an accurate centering process, which is, however, poor in efficiency.

In practice, centering a workpiece several times during a machining process has been done in order to eliminate irregularities in supporting positions on the opposite ends of the workpiece which may have been caused by low centering accuracy and temperature fluctuations. This procedure is carried out by mechanisms positioned respectively at the headstock and the tailstock of the machine tool for sliding the workpiece with respect to the axis of the machine tool. These mechanisms include motors for sliding the headstock and the tailstock, respectively, to effect centering adjustments. This arrangement, however, is a complex machine tool construction, and results in an increased machining time and poor efficiency since centering adjustments are required during a machining process.

SUMMARY OF THE INVENTION

It is a primary object of the present invention to provide a method of automatically correcting the misalignment of a workpiece on a numerically controlled machine tool such as a roll grinder in order to machine the workpiece to a properly finished shape even if the workpiece as mounted on the machine tool is misaligned or not accurately aligned with the axis of the machine tool.

Another object of the present invention is to provide a method of correcting the misalignment of a workpiece on a numerically controlled machine tool for machining the workpiece into a roll while rotating the workpiece at a prescribed speed, moving the tool back and forth radially thereof, and moving the tool axially thereof, said method comprising the steps of:

measuring the amount of misalignment of the axis of the workpiece and entering the measured amount as corrective data into a control system which stores numerical control data produced by successively programming amounts of radial movement of a tool dependent on axial positions of the tool;

calculating corrected values of, among said numerical control data, the positional data of the tool in the axial direction and/or corrected values of the data on the amounts of movement of the tool in the radial direction, based on the corrective data; and controlling said tool based on the calculated corrected values to machine the workpiece.

Still another object of the present invention is to provide a method of automatically correcting the misalignment of a workpiece on a numerically controlling machine tool, wherein said corrective data are entered as at least the coordinates in the axial and radial directions of a starting point on the workpiece where the workpiece should start being machined based on the corrected values and of an ending point on the workpiece where the workpiece should stop being machined based on the corrected values.

Yet another object of the present invention is to provide a method of automatically correcting the misalignment of a workpiece on a numerically controlling machine, wherein the corrected values of the positional data of the tool in the axial direction and/or the corrected values of the data on the amounts if movement of the tool in the radial direction are calculated based on the corrective data through coordinate transformation in order to align an axis of the inherent coordinates of the control system with the axis of the workpiece.

Yet still another object of the present invention is to provide a method of automatically correcting the misalignment of a workpiece on a numerically controlling machine, wherein corrected data $C'$ on the amount of movement of the tool in the radial direction (X direction) with respect to a prescribed position of the tool in the axial direction (Z direction) is indicated by:

$$C' = C + \left[ \frac{\Delta X}{\Delta Z} Z - \frac{Xa'Zb' - Xb'Za'}{\Delta Z} \right]$$

where C is data on the amount of movement prior to correction, $\Delta X = Xa - Xb$ $\Delta Z = Za - Zb$ $$Xa' = Xa + Sx$$

$$Xb' = Xb + Sx$$

$$Za' = Za + Sz$$

$$Zb' = Zb + Sz$$

Xa, Za are the coordinates of he starting point on the workpiece, Xb, Zb are the coordinates of the ending point on the workpiece, and Sx, Sz are components in the X and Y directions of the radius S of he workpiece before it is machined.

A still further object of the present invention is to provide a method of automatically correcting the misalignment of a workpiece on a numerically controlling machine, wherein corrected positional data Z of the tool in the axial direction (Z direction) and corrected data X on the amounts of movement of the tool in the radial direction (X direction) are indicated by:

$$\begin{bmatrix} X \\ Z \end{bmatrix} = \begin{bmatrix} T_{11} & T_{12} \\ T_{21} & T_{22} \end{bmatrix} \begin{bmatrix} X' \\ Z' \end{bmatrix} + \begin{bmatrix} Cx \\ Cz \end{bmatrix}$$

where $X'$, $Z'$ are the data on the amount of movement and the positional data before they are corrected, $$T_{11} = \frac{\Delta Z}{\sqrt{\Delta X^2 - \Delta Z^2}}$$

$$T_{12} = \frac{\Delta X}{\sqrt{\Delta X^2 - \Delta Z^2}}$$

$$T_{21} = \frac{-\Delta X}{\sqrt{\Delta X^2 + \Delta Z^2}}$$

$$T_{22} = \frac{\Delta Z}{\sqrt{\Delta X^2 + \Delta Z^2}}$$

$$\Delta X = Xa - Xb$$
$$\Delta Z = Za - Zb$$

$$Cx = Xa - \frac{\Delta Z}{\sqrt{\Delta X^2 + \Delta Z^2}} S - \frac{\Delta X}{\sqrt{\Delta X^2 + \Delta Z^2}} Za$$

$$Cz = Za + \frac{\Delta X}{\sqrt{\Delta X^2 + \Delta Z^2}} S - \frac{\Delta Z}{\sqrt{\Delta X^2 + \Delta Z^2}} Za$$

Xa, Za are the coordinates of the starting point on the workpiece, Xb, Zb are the coordinates of the ending point on the workpiece, and S is the radius of the workpiece before it is machined.

The above and other objects, features and advantages of the present invention will become more apparent from the following description when taken in conjunction with the accompanying drawings in which a preferred embodiment of the present invention is shown by way of illustrative example.

DETAILED DESCRIPTION OF THE PREFERRED EMBODIMENT

Figure 1:
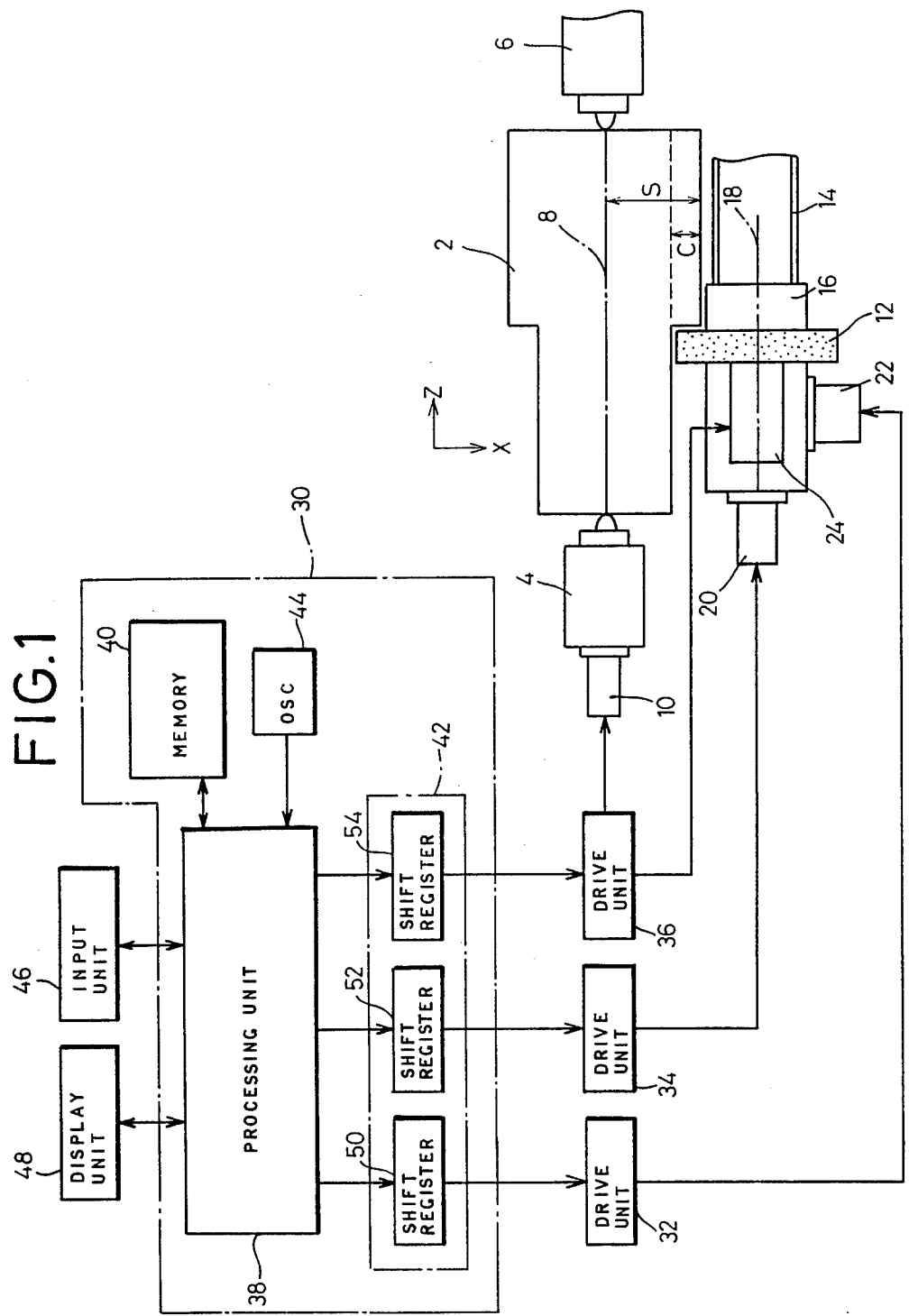
FIG. 1 is a schematic view, partly in block form, of a numerically controlled machine tool on which a method of the present invention will be carried out.

As shown in FIG. 1, a workpiece 2 to be machined into a roll for use in a rolling mill is fixedly mounted on a numerically controlled machine tool between a headstock 4 and a tailstock 6 with the longitudinal axis of the workpiece 2 being aligned with the axis 8 (in the direction of the arrow Z) of the machine tool. A spindle motor 10 is coupled to the headstock 4 for rotating the workpiece 2 about the axis 8.

A grinding tool 12 comprising a rotatable grindstone is mounted on a slide table 16 slidably guided on a guide 14, the grindstone 12 being rotatable about an axis 18 by a motor 24. The slide table 16 is caused by a servomotor 20 to slide in the direction of the arrow Z while being guided along the guide 14. The slide 16 is also slidable by a servomotor 22 in the direction of the arrow X (radially of the workpiece 2) along another guide mechanism (not shown).

A numerical control unit 30 serves to distribute command pulses to drive units 32, 34, 36 which drive the servomotors 20, 22, the spindle motor 10, and the grindstone motor 24 for controlling rotation of the workpiece 2 and the grindstone 12 and movement of the workpiece 2 and the grindstone 12 along X and Y axes in order to grind the workpiece 2 to a shape commanded by numerical control data.

The numerical control unit 30 comprises a processing unit 38 in the form of a microcomputer or the like, a memory 40 for storing a control program and numerical control data to enable the processing unit 38 to effect numerical control operation, and a pulse distributor circuit 42 for distributing command pulses to the drive units 32, 34, 36 in response to commands from the processing unit 38. The numerical control unit 30 also includes an oscillator 44 coupled to the processing unit 38. The pulse distributor circuit 42 has shift registers 50, 52, 54. The numerical control unit 30 is connected to an input unit 46 for entering a control program, numerical control data, and the like, and also to a display unit 48. Denoted at C is a depth of cut, and S is a radius of the workpiece 2 before it is ground.

A method of correcting the misalignment of the workpiece 2 on the numerically controlled machine tool thus constructed will be described below.

Figure 2:
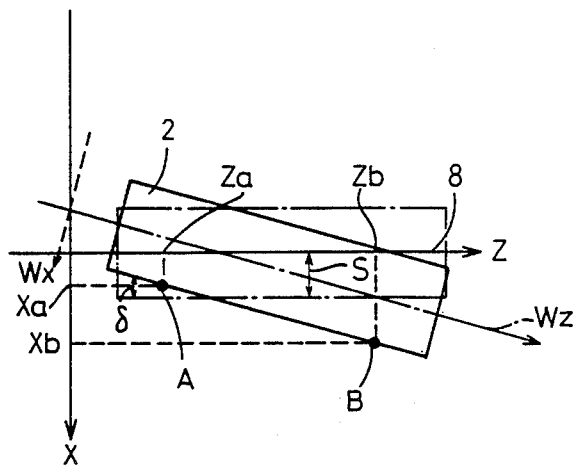
FIG. 2 is a diagram showing the manner in which a workpiece is mounted on the machine tool.
Figure 3:
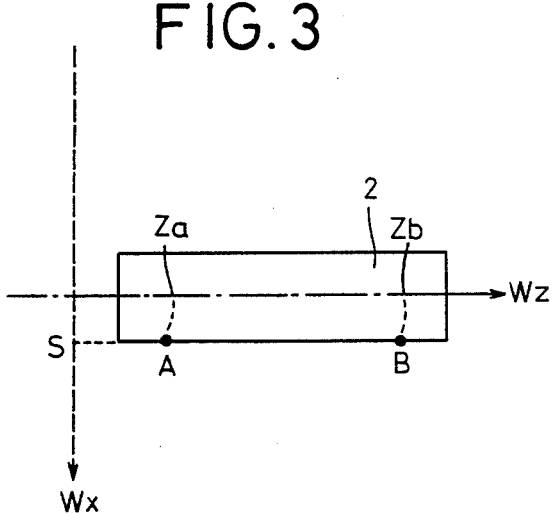
FIG. 3 is a diagram of a coordinate system having an axis aligned with the axis of the workpiece.

FIG. 2 schematically shows the manner in which the workpiece 2 is mounted on the machine tool. If the axis Wz of the workpiece 2 is not aligned with or is displaced from the axis 8 (in the direction of the arrow Z) of the machine tool, then the amount of misalignment or displacement of the axis Wz if the workpiece 2 is measured by a micrometer or the like to determine corrective data for the numerical control data, and the corrective data are then entered into the processor 38. The corrective data should represent least the coordinates (Xa, Za) on the X and Z axes of a point A where misalignment correction should be started and the coordinates (Xb, Zb) on the X and Z axes of a point B where misalignment correction should be ended.

Based on the corrective data, the processing unit 38 corrects, among the numerical control data stored in the memory 40, the positional data of the grindstone 12 along the axis 18 and/or the data on the amount of movement of the grindstone 12 in the radial direction (indicated by the arrow X).

According to a first process of effecting such data correction, the depth of cut C in the radial direction (indicated by the arrow X) of the grindstone 12 is corrected dependent on the position of the grindstone 12 along the axis 18 so that a corrected depth of cut C' will be represented by:

$$C' = C + \delta \qquad (1)$$

where C is the depth of cut by the grindstone 12 and $\delta$ is the amount of misalignment of the workpiece 2 shown in FIG. 2. The amount of misalignment $\delta$ is given by the following equation:

$$\delta = \frac{\Delta X}{\Delta Z} Z - \frac{Xa'Zb' - Xb'Za'}{\Delta Z} \qquad (2)$$

where $$\begin{cases} \Delta X = Xa - Xb \\ \Delta Z = Za - Zb \end{cases} \qquad (3)$$

$$\begin{cases} Xa' = Xa + Sx \\ Xb' = Xb + Sx \end{cases} \begin{cases} Za' = Za + Sz \\ Zb' = Zb + Sz \end{cases} \qquad (4)$$

$$\begin{cases} Sx = \frac{\Delta X}{\sqrt{\Delta X^2 + \Delta Z^2}} S \\ Sz = \frac{\Delta Z}{\sqrt{\Delta X^2 + \Delta Z^2}} S \end{cases} \qquad (5)$$

where S is the radius of the workpiece 2. When a misalignment correction command and the corrective data are entered into the processing unit 38 from the input unit 46, the processing unit 38 effects corrective calculations according to the equations (1) and (2) to correct the amount of movement of the grindstone 12 in the radial direction (indicated by the arrow X), i.e., the depth of cut C, dependent on the position of the grindstone 12 along the axis 18 (in the direction of the arrow Z), and enables the grindstone 12 to grind the workpiece 2 to the depth of cut C'. Thus, the workpiece misalignment can automatically be corrected.

According to a second process of correcting the workpiece misalignment, the coordinates of command values of the numerical control data are transformed so that an axis of the inherent coordinate system of the numerical control unit 30 will be aligned with the axis Wz of the workpiece 2.

More specifically, the coordinates of the numerical control data are transformed so that a radial direction Wx normal to the axis Wz of the workpiece 2 will be used as an X axis. This coordinate transformation is defined by the following equation:

$$\begin{bmatrix} X \\ Z \end{bmatrix} = \begin{bmatrix} T_{11} & T_{12} \\ T_{21} & T_{22} \end{bmatrix} \begin{bmatrix} X' \\ Z' \end{bmatrix} + \begin{bmatrix} Cx \\ Cz \end{bmatrix} \qquad (6)$$

where $$T_{11} = \frac{\Delta Z}{\sqrt{\Delta X^2 - \Delta Z^2}} \qquad (7)$$

$$T_{12} = \frac{\Delta X}{\sqrt{\Delta X^2 - \Delta Z^2}}$$

-continued $$T_{21} = \frac{-\Delta X}{\sqrt{\Delta X^2 + \Delta Z^2}}$$

$$T_{22} = \frac{\Delta Z}{\sqrt{\Delta X^2 + \Delta Z^2}}$$

$$Cx = Xa - \frac{\Delta Z}{\sqrt{\Delta X^2 + \Delta Z^2}} S - \frac{\Delta X}{\sqrt{\Delta X^2 + \Delta Z^2}} Za \qquad (8)$$

$$Cz = Za + \frac{\Delta X}{\sqrt{\Delta X^2 + \Delta Z^2}} S - \frac{\Delta Z}{\sqrt{\Delta X^2 + \Delta Z^2}} Za$$

When a misalignment correction command and the corrective data are entered into the processing unit 38 from the input unit 46, the processing unit 38 carries out a corrective calculation according to the equation (6) to transform the coordinates of the positional data of the grindstone 12 along the axis 18 and the data on the amount of movement of the grindstone 12 in the radial direction (indicated by the arrow X) from the inherent Z and X coordinates of the numerical control unit 30 to those along the axis Wz and the radial direction Wx of the workpiece 2, and enables the grindstone 12 to grind the workpiece 2 based on the transformed coordinate data. Accordingly, the workpiece misalignment can automatically be corrected.

With the method of the present invention, as described above, the misalignment of the workpiece is measured to obtain corrective data, calculates corrected values of, among the numerical control data, the positional data of the tool along the axis and/or the date on the amount of movement of the tool in the radial direction based on the corrective data, and controls the tool based on the corrected values to machine the workpiece. Therefore, it is not necessary to effect an accurate centering procedure when mounting the workpiece on the machine tool, and the number of steps required for machining the tool is reduced and the machining efficiency is increased. Since no special workpiece centering mechanism is required on the machine tool, the machine tool is highly simple in structure.

Although a certain preferred embodiment has been shown and described, it should be understood that many changes and modifications may be made therein without departing from the scope of the appended claims.

What is claimed is:

1. A method of correcting the misalignment of a workpiece on a numerically controlled machine tool for machining the workpiece into a roll while rotating the workpiece at a prescribed speed, moving the tool back and forth radially thereof, and moving the tool axially thereof, said method comprising the steps of:
   measuring the amount of misalignment of the axis of the workpiece and entering the measured amount as corrective data into a control system which stores numerical control data produced by successively programming amounts of radial movement of a tool depending upon axial positions of the tool;
   calculating corrected values of at least one of the positional data of the tool in the axial direction and the data on the amount of movement of the tool in the radial direction, based on said corrective data; and
   controlling said tool based on the calculated corrected values to machine the workpiece.

2. A method according to claim 1, wherein said corrective data are entered as at least the coordinates in the axial and radial directions of a starting point on the workpiece where the workpiece should start being machined based on the corrected values and of an ending point on the workpiece where the workpiece should stop being machined based on the corrected values.

3. A method according to claim 2, wherein the corrected values are calculated based on said corrective data through coordinate transformation in order to align an axis of the inherent coordinates of the control system with the axis of the workpiece.

4. A method according to claim 2, wherein corrected data C′ on the amount of movement of the tool in the radial direction (X direction) with respect to a prescribed position of the tool in the axial direction (Z direction) is indicated by:

$$C' = C + \left[ \frac{\Delta X}{\Delta Z} Z - \frac{Xa'Zb' - Xb'Za'}{\Delta Z} \right]$$

where C is data on the amount of movement prior to correction, $\Delta X = Xa - Xb$ $\Delta Z = Za - Zb$ $Xa' = Xa + Sx$ $Xb' = Xb + Sx$ $Za' = Za + Sz$ $Zb' = Zb + Sz$ Xa, Za are the coordinates of the starting point on the workpiece, Xb, Zb are the coordinates of the ending point on the workpiece, and Sx, Sz are components in the X and Y directions of the radius S of the workpiece before it is machined.

5. A method according to claim 3, wherein corrected positional data Z of the tool in the axial direction (Z direction) and corrected data X on the amounts of movement of the tool in the radial direction (X direction) are indicated by:

$$\begin{bmatrix} X \\ Z \end{bmatrix} = \begin{bmatrix} T_{11} & T_{12} \\ T_{21} & T_{22} \end{bmatrix} \begin{bmatrix} X' \\ Z' \end{bmatrix} + \begin{bmatrix} Cx \\ Cz \end{bmatrix}$$

where X′, Z′ are the data on the amount of movement and the positional data before they are corrected, $$T_{11} = \frac{\Delta Z}{\sqrt{\Delta X^2 - \Delta Z^2}}$$

$$T_{12} = \frac{\Delta X}{\sqrt{\Delta X^2 - \Delta Z^2}}$$

$$T_{21} = \frac{-\Delta X}{\sqrt{\Delta X^2 + \Delta Z^2}}$$

$$T_{22} = \frac{\Delta Z}{\sqrt{\Delta X^2 + \Delta Z^2}}$$

$\Delta X = Xa - Xb$
$\Delta Z = Za - Zb$ $$Cx = Xa - \frac{\Delta Z}{\sqrt{\Delta X^2 + \Delta Z^2}} S - \frac{\Delta X}{\sqrt{\Delta X^2 + \Delta Z^2}} Za$$

$$Cz = Za + \frac{\Delta X}{\sqrt{\Delta X^2 + \Delta Z^2}} S - \frac{\Delta Z}{\sqrt{\Delta X^2 + \Delta Z^2}} Za$$

Xa, Za are the coordinates of the starting point on the workpiece, Xb, Zb are the coordinates of the ending point on the workpiece, and S is the radius S of the workpiece before it is machined.

* * * * *

UNITED STATES PATENT AND TRADEMARK OFFICE
CERTIFICATE OF CORRECTION

PATENT NO. : 4,942,611
DATED : July 17, 1990
INVENTOR(S) : Takashi KUNUGI and Yoshinari SASAKI It is certified that error appears in the above-identified patent and that said Letters Patent is hereby corrected as shown below:

Col. 1, line 18, change "generay" to --generally--;
line 23, change "mean" to --means--;
line 30, change "ne" to --the--;
line 31, after "such" insert --a--;
line 45, change "too" to --tool--; and
line 64, after "however" insert --,--.

Col. 2, line 46, change "if" to --of--.

Col. 3, line 11, change "he" to --the--.

Col. 4, line 8, change "the" to --an--;
line 17, after "slide" insert --table--; and
line 56, after "represent" insert --at--.

Col. 6, line 32, change "date" to --data--.

Signed and Sealed this

Third Day of March, 1992

Attest:

HARRY F. MANBECK, JR.

*Attesting Officer*     *Commissioner of Patents and Trademarks*